(12) United States Patent
Sasin et al.

(10) Patent No.: US 11,485,359 B2
(45) Date of Patent: Nov. 1, 2022

(54) WARNING SYSTEM FOR A HOST AUTOMOTIVE VEHICLE

(71) Applicant: Aptiv Technologies Limited, St. Michael (BB)

(72) Inventors: Dominik Sasin, Cracow (PL); Dariusz Borkowski, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 102 days.

(21) Appl. No.: 17/185,920

(22) Filed: Feb. 25, 2021

(65) Prior Publication Data

US 2021/0300360 A1 Sep. 30, 2021

(30) Foreign Application Priority Data

Mar. 27, 2020 (EP) .................................... 20166435

(51) Int. Cl.
*B60W 30/095* (2012.01)
*H04W 4/46* (2018.01)
(Continued)

(52) U.S. Cl.
CPC ......... *B60W 30/0956* (2013.01); *B60Q 1/525* (2013.01); *B60W 30/18154* (2013.01);
(Continued)

(58) Field of Classification Search
CPC ....... B60W 30/0956; B60W 30/18154; B60W 40/04; B60W 50/0097; B60W 2554/80;
(Continued)

(56) References Cited

U.S. PATENT DOCUMENTS 9,637,965 B1* 5/2017 Kothari .................. E05F 15/40
10,190,357 B2* 1/2019 Kothari .................... B60Q 9/00
(Continued)

FOREIGN PATENT DOCUMENTS

DE 102016000440 8/2016
FR 2835082 7/2003

OTHER PUBLICATIONS

"Extended European Search Report", EP Application No. 20166435.6, dated Sep. 28, 2020, 10 pages.
(Continued)

*Primary Examiner* — Hussein Elchanti
(74) *Attorney, Agent, or Firm* — Sawtooth Patent Group PLLC

(57) ABSTRACT

When two target objects cannot see each other and at least one of them is a moving object following lanes, the warning system identifies the couples of two predicted trajectories having at least one point in common or an inter-trajectory distance less than a distance threshold ($d_{th}$), among all possible couples of two predicted trajectories for the two respective target objects, then calculates a probability of collision for each identified couple of trajectories, by determining a predicted collision time and calculating probability distribution functions for the positions of the two target objects at said predicted collision time, and checks whether or not the probability of collision calculated for at least one of the identified couples of trajectories is more than a collision probability threshold in order to trigger an alert towards at least one of the two target objects.

20 Claims, 10 Drawing Sheets

(51) Int. Cl.
*H04W 4/90* (2018.01)
*B60Q 1/50* (2006.01)
*B60W 30/18* (2012.01)
*B60W 40/04* (2006.01)
*B60W 50/00* (2006.01)
*G06N 7/00* (2006.01)

(52) U.S. Cl.
CPC ........ *B60W 40/04* (2013.01); *B60W 50/0097* (2013.01); *G06N 7/005* (2013.01); *H04W 4/46* (2018.02); *H04W 4/90* (2018.02); *B60W 2554/80* (2020.02)

(58) Field of Classification Search
CPC .......... H04W 4/46; H04W 4/90; B60Q 1/525; G06N 7/005
See application file for complete search history.

(56) References Cited

U.S. PATENT DOCUMENTS

| | | | | |
|---|---|---|---|---|
| 2005/0171690 A1* | 8/2005 | Brass | ............... | G01C 21/365 701/431 |
| 2007/0080825 A1* | 4/2007 | Shiller | ............... | B62D 15/029 340/903 |
| 2009/0160678 A1 | 6/2009 | Turnbull | | |
| 2010/0063736 A1* | 3/2010 | Hoetzer | ............... | B60W 30/09 701/301 |
| 2011/0015818 A1* | 1/2011 | Breuer | ............... | G08G 1/167 701/31.4 |
| 2011/0260848 A1* | 10/2011 | Rodriguez Barros | . | B60Q 1/324 340/438 |
| 2012/0218093 A1* | 8/2012 | Yoshizawa | ............... | B60W 30/095 340/435 |
| 2014/0049058 A1* | 2/2014 | Kudoh | ............... | E05B 77/38 292/336.3 |
| 2014/0067206 A1* | 3/2014 | Pflug | ............... | B60W 10/04 701/41 |
| 2014/0303847 A1* | 10/2014 | Lavoie | ............... | B62D 15/0275 701/41 |
| 2014/0313335 A1* | 10/2014 | Koravadi | ............... | H04N 7/181 348/148 |
| 2015/0002288 A1* | 1/2015 | Lee | ............... | B60Q 1/323 340/471 |
| 2015/0094943 A1* | 4/2015 | Yoshihama | ............... | G08G 1/16 701/301 |
| 2016/0084664 A1* | 3/2016 | Margalit | ............... | G01C 21/3438 701/410 |
| 2016/0290019 A1* | 10/2016 | Nagata | ............... | E05B 77/06 |
| 2017/0089114 A1* | 3/2017 | Rider | ............... | G01L 19/14 |
| 2017/0243071 A1 | 8/2017 | Stein et al. | | |
| 2018/0151077 A1* | 5/2018 | Lee | ............... | B60Q 9/008 |
| 2019/0035276 A1* | 1/2019 | Zruya | ............... | G06V 20/584 |
| 2019/0086227 A1* | 3/2019 | Laaksonen | ............... | G01C 21/362 |
| 2020/0160054 A1* | 5/2020 | Rogan | ............... | G06V 20/20 |
| 2020/0286384 A1* | 9/2020 | Borsos | ............... | G08G 1/164 |
| 2020/0361491 A1* | 11/2020 | Kitaura | ............... | B60W 30/0956 |
| 2021/0001860 A1* | 1/2021 | Kawasaki | ............... | B60W 60/00274 |
| 2021/0078600 A1* | 3/2021 | Price | ............... | G08G 1/16 |

OTHER PUBLICATIONS

Jansson, "Collision Avoidance Theory with Application to Automotive Collision Mitigation", Linkoping Studies in Science and Technology. Dissertations No. 950, Chapter 7.3 Probability of Collision, pp. 96-99, 2005, 5 pages.

* cited by examiner

WARNING SYSTEM FOR A HOST AUTOMOTIVE VEHICLE

CROSS-REFERENCE TO RELATED APPLICATION

This application claims priority to European Patent Application Number 20166435.6, filed Mar. 27, 2020, the disclosure of which is hereby incorporated by reference in its entirety herein.

BACKGROUND

The present disclosure relates to the field of warning system for a vehicle and a corresponding process. Such a warning system can be used for example in a vehicle in order to warn other road users when a potential risky situation is detected by the system.

Road users, like vehicles, pedestrians, scooters, motorcycles, bicycles, are more and more today, which increases the number of road accidents. It is known that some particular road situations are susceptible to cause accidents. For example, at a bus stop, when a bus is temporarily stopped, passengers may alight from the bus, move in the area around the bus and cross the road near the bus. While the bus is stopped, a vehicle may want to overtake it. Such a situation is highly risky since both the passengers and the driver of the vehicle may lack visibility due to the presence of the bus.

Document US 2009 0160678 A1 discloses a warning apparatus installed on a bus for generating a hazard alert for public safety, when the bus is stopped at a bus stop and the bus doors are opened for passengers to alight from the bus. The warning apparatus is equipped with sensors that can detect the presence, speed and direction of travel of a car that is approaching the bus from behind and is expected to overtake the bus. In such a situation, the warning apparatus of the bus generates an alert on the basis of the open door condition of the bus and the presence and properties (speed and direction) of the car approaching. The alert may comprise warning messages displayed, lights emitted and/or audible alerts transmitted at appropriate positions of the bus in order to be seen or heard by pedestrians who want to cross the road near or behind the bus and by the driver of the car approaching from behind the bus. US 2009 0160678 A1 also discloses that, when the driver of the car cannot see the pedestrians and vice versa, the warning system may detect the speeds of both the pedestrian and car, and determine whether or not the car is likely to collide with the pedestrian crossing the road at a potential impact point that is calculated based on the speed of the pedestrian and the car information. If the pedestrian and the car are on a course for collision, the warning apparatus generates an alert in order to warn the pedestrian and the driver of the car of the hazard. The warnings are made relevant by obtaining and/or measuring real time data concerning road users (pedestrians and car), including position, speed and distance parameters, in the area nearby the bus and producing an alert based on these data. This serves to improve safety and reduce the risk of accidents occurring in the region area near the bus that is a safety hazard.

The risk evaluation disclosed in US 2009 0160678 A1 is simple and allows to determine the likelihood of a collision and the point of a potential collision. It is based on one or more properties of each of the bus, the car coming from behind the bus and the pedestrians near the bus, such as for example an open door status of the bus, a speed and a direction of travel of the pedestrians, a speed and a direction of travel of the car moving toward the bus and due to overtake it.

However, the risk evaluation of a collision made in US 2009 0160678 A1 is very simplified. For example, it is based on the assumption that the car is going to overtake the bus. This may result in lots of false alerts, that are not relevant or adequate. Therefore, the road users will get the impression over time that these alerts are not reliable and may then ignore them. In addition, US 2009 0160678 A1 deals with a very specific situation in which a bus is stopped at a bus stop, passengers alight from the bus and a car is moving toward the bus from behind. Many other road traffic situations may possibly result in a collision and be considered as risky.

The present disclosure improves the situation and provides a warning system that can evaluate a risk of a collision between two road users in a wide variety of hazard road situations and warn them in a relevant manner.

SUMMARY

The present disclosure concerns a warning system for an host automotive vehicle including a detection device for detecting two target objects that cannot see each other; a road driving pattern determination device for determining, for each of the two target objects detected by the detection device, whether or not said target object is a moving object following lanes, a first prediction device for predicting a plurality of trajectories taking lanes for a target object determined as a moving object following lanes; a second prediction device for predicting one trajectory for a target object not determined as a moving object following lanes, based on a current state of said target object and a motion model said target object is assumed to comply with. The warning system further including an identification device that, when two target objects are detected by the detection device, identifies at least one couple of two predicted trajectories having at least one point in common or a distance between said two predicted trajectories that is less than a predetermined safe distance threshold ($d_{th}$); a probability calculation device for calculating a probability of collision for each identified couple of predicted trajectories that determines a predicted collision time, when the two target objects are likely to collide by taking respectively the two predicted trajectories of said identified couple, calculates probability distribution functions for the positions of the two target objects at said predicted collision time, and calculates the probability of collision for said identified couple of predicted trajectories using the calculated probability distribution functions for the positions of the two target objects at said predicted collision time; an alert control device that checks whether or not the probability of collision calculated for said identified couple of predicted trajectories is more than a collision probability threshold in order to trigger an alert towards at least one of the two target objects.

Such a warning system is able to detect a wide variety of hazard situations and to trigger relevant alerts. The risk of irrelevant alerts that lead road users to ignore the alerts over time is reduced.

Advantageously, when the two target objects are detected by the detection device and at least one of said two target objects is determined as a moving object following lanes, the identification device may identify one or more couples of two predicted trajectories having at least one point in common or a distance between said two predicted trajectories that is less than a predetermined safe distance threshold, among all possible couples of two predicted trajectories for the two respective target objects.

In calculating the probability of collision for said identified couple of predicted trajectories, the probability calculation device can take into account an intersection area of the probability distribution functions for the positions of the two target objects, and/or probabilities of said predicted trajectories, and/or shapes of said target objects.

Optionally, the probability calculation device determines a number N of points of interest for a first of the two target objects, disposed along abounding shape of said first target object, and a predetermined geometrical bounding shape for a second of the two target objects, calculates, for each of the N points of interest of the first target object, a probability of collision that said point of interest will be positioned in the area within the bounding shape of the second target object; and selects the highest value of the N calculated probabilities of collision as the probability of collision of the two target objects for said identified couple of predicted trajectories.

Optionally, in predicting a plurality of trajectories taking lanes for a target object determined as a moving object following lanes, the first prediction device selects trajectories that comply with road traffic rules.

In a first embodiment, when the two target objects detected by the detection device are moving objects following lanes, the identification device identifies, among all the possible couples of predicted trajectories of the two target objects respectively, the one or more couples of predicted trajectories that have a crossing point or an overlapping lane region.

In a second embodiment, when the two target objects detected by the detection device are one moving object following lanes and one object not determined as a moving object following lanes, the identification device identifies, among all the possible couples of predicted trajectories of the two target objects respectively, the one or more couples of predicted trajectories that have a crossing point or distance between the two predicted trajectories that is less than said safe distance threshold.

In a third embodiment, when the two target objects detected by the detection device are not determined as moving objects following lanes, the second prediction device predicts one trajectory for each of the two target objects, based on a current state of said target object and a motion model said target object is assumed to comply with, and the identification device that determines whether or not the couple of two predicted trajectories have at least one point in common or a distance between said two predicted trajectories that is less than a predetermined safe distance threshold.

The probability calculation device can determine the earliest collision time, when the distance between the respective positions of the two target objects is less than a predetermined safe distance threshold d_th, as the predicted collision time.

Advantageously, when the two target objects are determined as moving objects following lanes or when one of the two target objects is determined as a moving object following lanes and the other target object is determined as a moving object not following lanes, the probability calculation device may calculate successive discrete positions of the two target objects along their respective predicted trajectories at successive discrete times calculated using a time increment that depends on the speed of the faster of the two target objects, and the predicted collision time corresponds to one of the successive discrete times.

The alert control device can check that a time to collision, that is a time period between a current time and a predicted time to collision is less than a first time threshold in order to trigger an alert towards at least one of the two target objects.

The alert control device can check that a time to collision since both target objects have mutual visibility is less than a second time threshold in order to trigger an alert towards at least one of the two target objects.

The alert control device can check the position of the host vehicle with respect to the two target objects in order to trigger an alert toward at least one of the two target objects.

A second aspect of the disclosure concerns a host vehicle equipped with the warning system above defined.

A third aspect of the disclosure concerns a warning method performed by a host automotive vehicle having a warning system including: detecting, by a detection device, two target objects that cannot see each other; determining, by a road driving pattern determination device, for each of the two target objects detected, whether or not said target object is a moving object following lanes; predicting, by a first prediction device, a plurality of trajectories taking lanes for a target object determined as a moving object following lanes; and predicting, by a second prediction device, one trajectory for a target object not determined as a moving object following lanes, based on a current state of said target object and a motion model said target object is assumed to comply with. The warning method further including, when two target objects are detected by the detection device and at least one of said two target objects is determined as a moving object following lanes, identifying, by an identification device, one or more couples of two predicted trajectories that have at least one point in common or a distance between said two predicted trajectories that is less than a predetermined safe distance threshold, among all possible couples of two predicted trajectories for the two respective target objects; calculating, by a probability calculation device, a probability of collision for each identified couple of predicted trajectories, said calculating including: determining a predicted collision time, when the two target objects are likely to collide by taking respectively the two predicted trajectories of said identified couple, calculating probability distribution functions for the positions of the two target objects at said predicted collision time, and calculating the probability of collision for said identified couple of predicted trajectories using the calculated probability distribution functions for the positions of the two target objects at said predicted collision time. The warning method further including checking, by an alert control device, whether or not the probability of collision calculated for said identified couple of predicted trajectories is more than a collision probability threshold, in order to trigger an alert towards at least one of the two target objects.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

The present disclosure relates to a warning system that is hosted in an automotive vehicle, like a car, referred as a host vehicle, and to a corresponding warning method.

The warning system has a first function of detecting a risky or hazard situation for at least two other road users, referenced as "target objects". The host vehicle is capable of analyzing a road traffic situation, identifying a pair of road users, or target objects, that cannot see each other and may possibly collide. However, the host vehicle may not cause the risky situation and may not be in danger itself. A road user or target object is defined as any object that can be present and is possibly moving on the road, for example an automotive vehicle like a car, a truck, a motorcycle or a bus, or a pedestrian, a bicycle, a scooter, etc. . . . . A second function of the warning system is to warn at least one of the target objects in order that the target object can be aware of the hazard and change its behavior in order to avoid the collision.

FIGS. 1 to 4 represent schematically different road traffic situations that may be potentially dangerous and are detected by the warning system 100 of a host vehicle 200.

Figure 1:
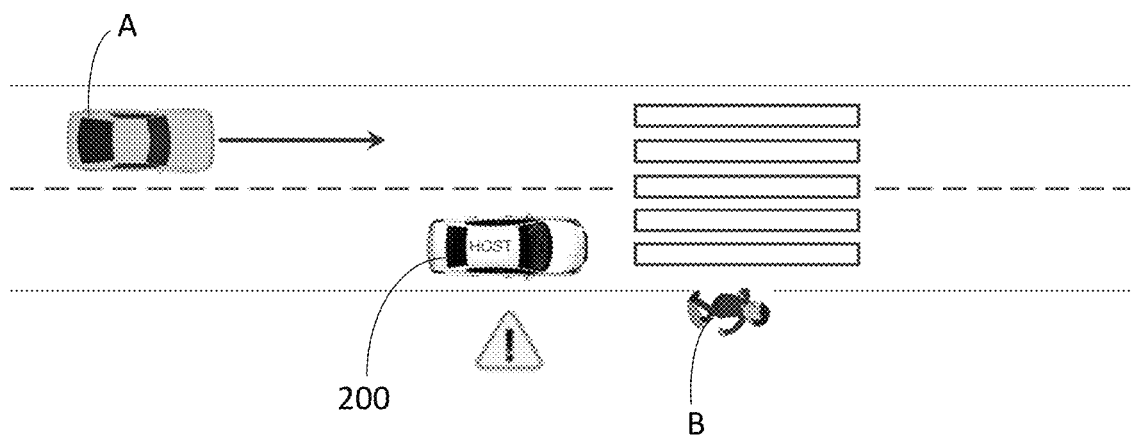
FIGS. 1 to 4 shows different road traffic situations considered as risky, each situation showing a host road user, hosting a warning system, and two target objects, that are road users and may possibly collide.

In FIG. 1, the host vehicle 200 is stopped in a first lane of the road in front of a crossing passage. A vehicle (first target object A), like a car, is moving along a second lane of the road, next to the first lane, from behind the host vehicle. A pedestrian (second target object B) is trying to pass the road. In such circumstances, it might happen that the driver of the vehicle referred as the first target object A won't see the pedestrian referred as the second target object B.

Figure 2:
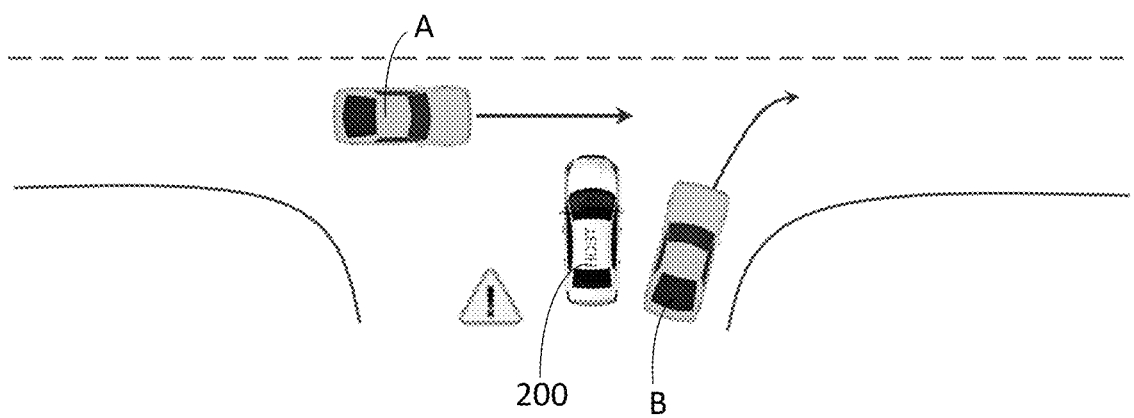

In FIG. 2, at a road intersection, the host vehicle 200 is stopped to let another vehicle A (first target object) on the left to pass by. There might be another vehicle B (second target object) trying to turn right with quite poor visibility. If the host vehicle 200 detects that none of both vehicles A, B is intended to stop, it might be expected that they will collide.

Figure 3:
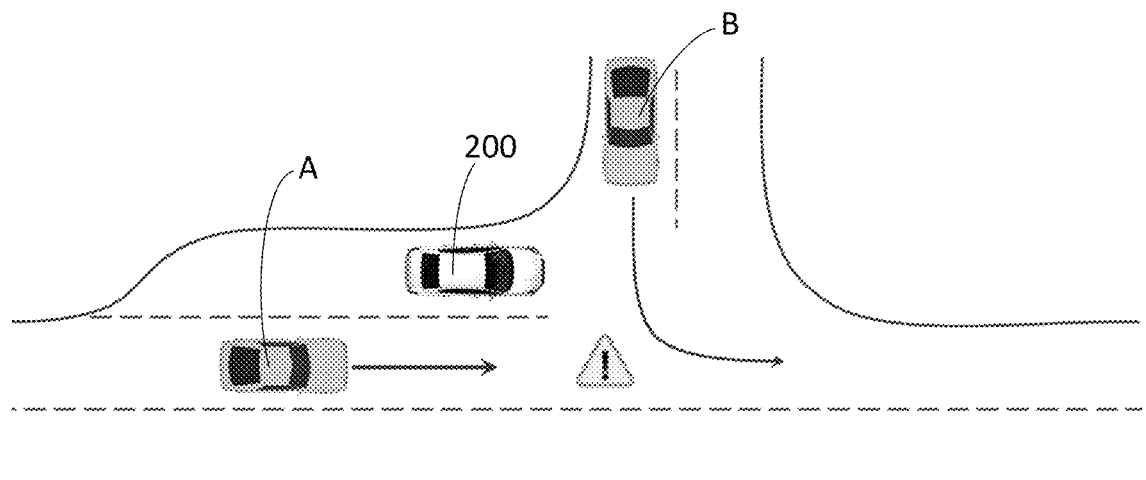

In FIG. 3, the host vehicle 200 is stopped on the left side of a first road, just before an intersection with a second road. A first vehicle A (first target object) is moving on the left lane of the first road from behind the host vehicle and towards the intersection. There might be another vehicle B (second target object) moving on the right lane of the second road towards the intersection. Both the two target vehicles have quite poor visibility due to the presence of the host vehicle stopped near the intersection. If the host vehicle 200 detects that none of both vehicles A, B is intended to stop, it might be expected that they will collide.

Figure 4:
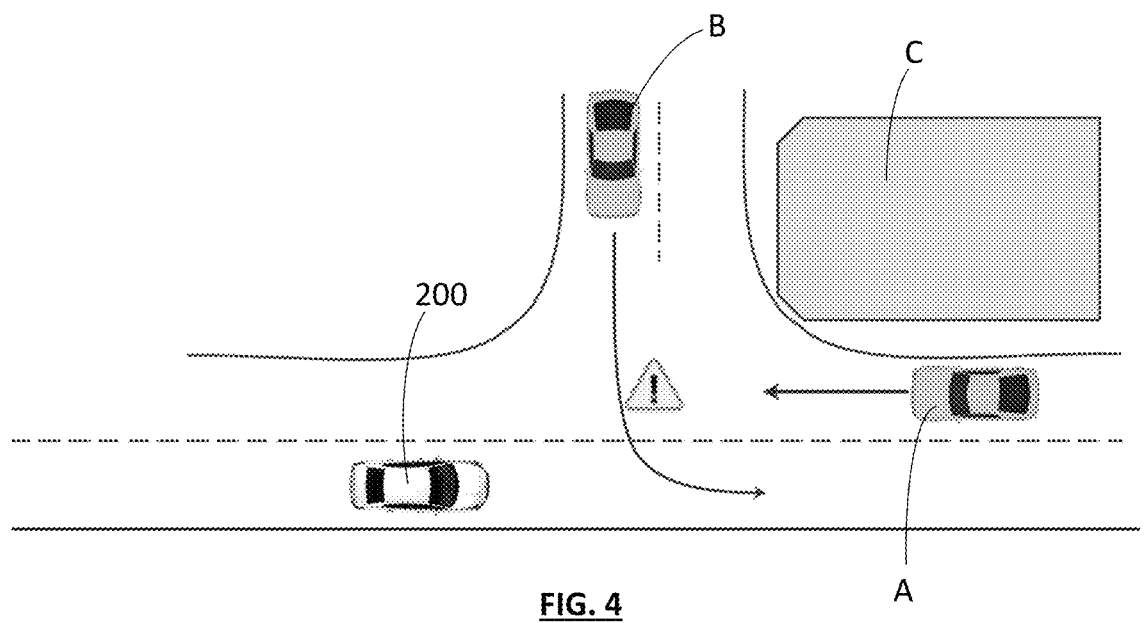

In FIG. 4, two target vehicles A, B are moving on first road and a second road respectively, towards an intersection between the two roads and cannot see each other due to the presence of a building C. The host vehicle 200 is moving on the first road towards the intersection and towards the first target vehicle A, but in a direction opposite to the moving direction of the first target vehicle A, and can see both target vehicles A, B. If the host vehicle 200 detects that none of both vehicles A, B is intended to stop, it might be expected that they will collide.

The warning system 100 in the host vehicle 200 can detect a hazard situation, like for example any of the situations shown in FIGS. 1 to 4, in which at least two target objects may collide, and then warn at least one of the two target objects.

An exemplary embodiment of the warning method of detecting a hazard road traffic situation, in which at least two target objects may collide, and of warning at least one of the two target objects will now be described in reference to FIGS. 5A and 5B. The warning method is performed by the warning system 100 of the host vehicle 200.

Figure 6:
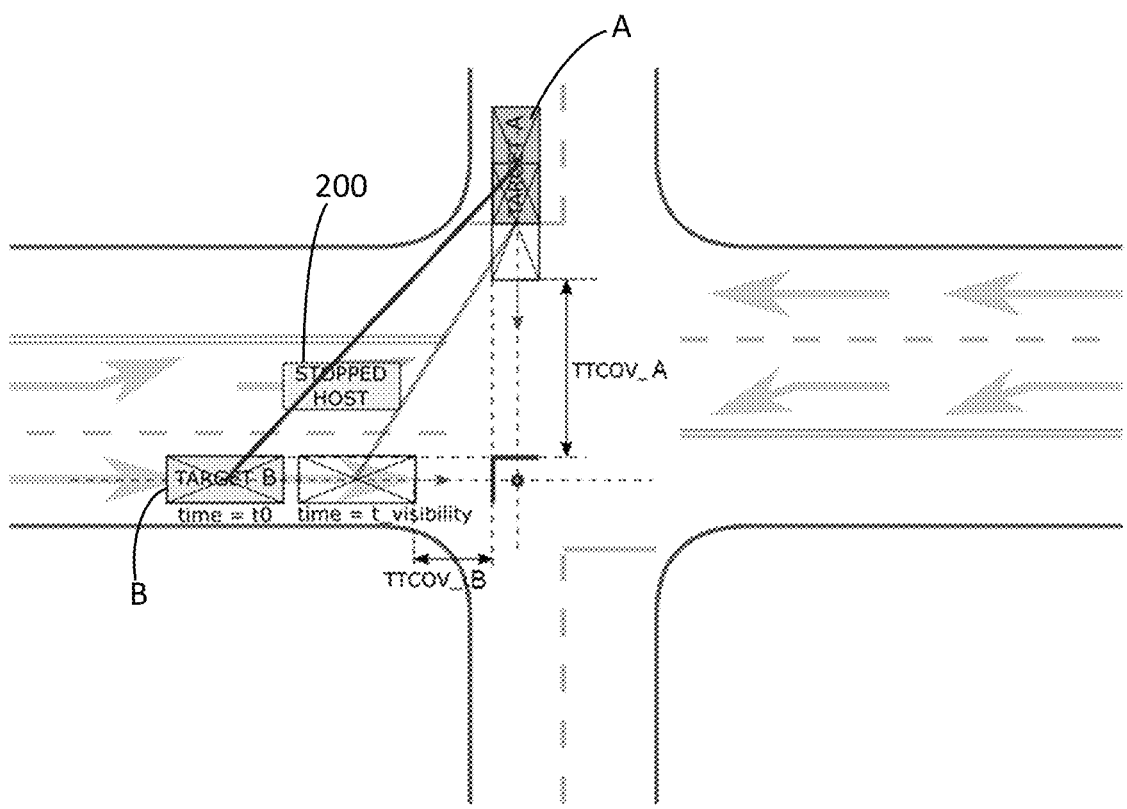
FIG. 6 represents schematically a parameter 'TTCOV' (Time to Collision since Objects mutual Visibility) for each target object of a pair of target objects (e.g. vehicles), in a situation in which the two target objects cannot see each other due to the presence of a stopped host object (e.g. a vehicle) between them.

In a first step S1, a detection device 120 of the warning system 100 of the host vehicle 200 detects a pair of two target objects that cannot see each other. The target objects are road users, for example automotive vehicles, scooters, motorcycles, bicycles, pedestrians, etc. . . . . The lack of visibility between two target objects, for example between vehicle A ('TARGET A') and vehicle B ('TARGET B') as represented in FIG. 6, is detected when a line connecting the respective centers of the two target objects A, B passes across an obstacle, for example the host vehicle 200 as represented in FIG. 6. The detection of the pair of target objects is for example performed by the detection device 120 processes and analyses captured data related to the environment of the host vehicle 200, for example images captured cameras 210 installed in the host vehicle 200, in order to detect two target objects that cannot see each other.

In the present disclosure, the warning system 100 detects one pair of target objects, in step S1. However, it may detect a plurality of pairs of target objects if there are several pairs of target objects that cannot see each other.

Then, the warning system 100 evaluates whether each detected target object A, B is following road lanes or not, based on lane information, in order to determine a road driving pattern of this target object, that is if the target object is a moving object following lanes or is not a moving object following lanes. More precisely, the warning system 100 determines whether or not the target object A is a moving object following lanes, in a step S2A, and whether or not the object B is a moving object following lanes, in a step S2B. The determination of the driving pattern of a target object is performed by a driving pattern determination device 130 of the warning system 100.

Figure 7A:
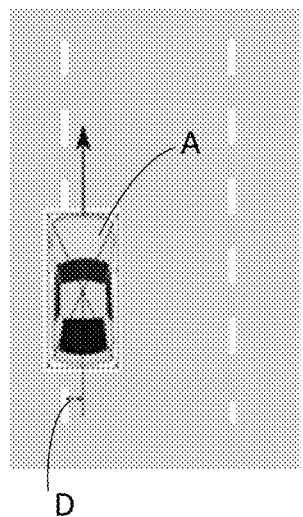
FIGS. 7A and 7B show target objects (e.g. vehicles) that do not follow road lanes correctly.
Figure 7B:
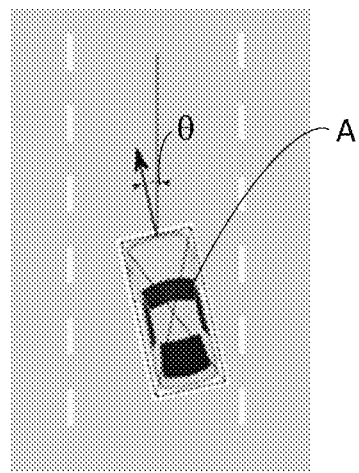
Figure 8:
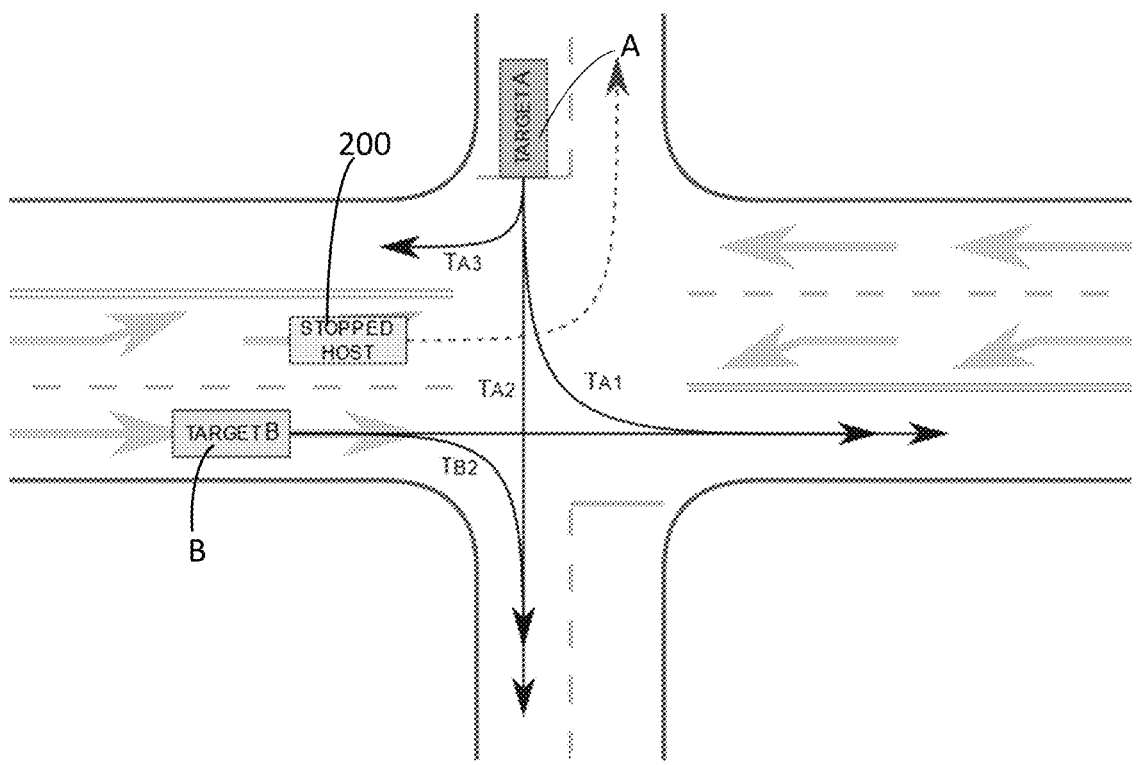
FIG. 8 shows different possible trajectories of each of the two target objects in the situation of FIG. 6.

For example, the absolute value of an angle θ between the direction of the lane currently followed by the moving target object (for example 'A' in FIG. 7A) and the direction of the moving target object is evaluated from the images captured by the host vehicle cameras and compared to a road heading threshold $θ_{th}$ by the device 130. If the absolute value of the angle θ is equal to or less than the road heading threshold $θ_{th}$, the device 130 determines that the target object is following the lane of the road. If the absolute value of the angle θ is more than the road heading threshold $θ_{th}$ for a time period more than a predetermined time threshold, the device 130 determines that the target object is not following the lane of the road. The predetermined time threshold can be determined empirically. For example, it may be a few seconds. The device 130 can also check whether or not the target object overlaps a lane adjacent to the lane being currently followed by the target object. For example, the absolute value of a distance D between a longitudinal center line of the target object and a border line of the lane being currently followed is evaluated from the images captured by the host vehicle cameras and compared to a line offset threshold Δ by the device 130. If the distance D is less than the line offset threshold Δ for a time period more than the predetermined time threshold, the device 130 determines that the target object is not following the road lane. If the distance D is equal to or more than the line offset threshold Δ, the device 130 determines that the target object is following the road lane.

Lane information can be provided to the determination device 130 for example by image capturing devices of the host vehicle 200, like cameras, and/or by a navigation system of the host vehicle 200. If lane information is not available for a target object, the determination device 130 determines that the target object is not a moving object following lanes.

In a first embodiment or situation, both target objects A and B are moving objects following lanes. In a second embodiment or situation, one target object, for example A, is following lanes and the other target object B is not following lanes. In a third embodiment or situation, both target objects A and B are moving objects not following lanes.

First Embodiment

In the first embodiment (or first situation), the target object A is a moving object following lanes and the target object B is also a moving object following lanes.

After step S2A, if the target object A is a moving object following a lane (branch Y in FIG. 5A), the warning system 100 predicts one or more trajectories as $T_{Ai}$, with i≥1, for the target object A, in a step S3A. In the same manner, after step S2B, if the target object B is a moving object following lanes (branch Y in FIG. 5A), the warning system 100 predicts one or more trajectories and $T_{Bj}$, with j≥1, for the target object B, in a step S3B.

The predicted trajectories $T_{Ai}$ and $T_{Bi}$ use lanes of roads. In other words, the predicted trajectories for target objects having the driving pattern "moving object following lanes" are trajectories that take (follow) lanes. The prediction of trajectories taking lanes, for target objects determined as moving objects following lanes, is performed by a first prediction device 140 of the warning system 100. The prediction uses lane information and optionally road traffic rules. A plurality of possible trajectories taking lanes are determined in the environment of the target object and, among these possible trajectories, only the trajectories that are likely, for example because they comply with the road traffic rules, are determined as predicted trajectories. It means that, in some embodiments, the trajectories that do not comply with the road traffic rules are excluded. This allows to reduce the calculation efforts. Thus, in predicting a plurality of trajectories taking lanes for a target object determined as a moving object following lanes, the first prediction device 140 selects trajectories that comply with road traffic rules. For example, a trajectory along a road lane but in a prohibited direction is not selected. The predicted trajectories are referenced as $T_{Ai}$, with i≥1, for the target object A, and $T_{Bj}$, with j≥1, for the target object B.

Then, after steps S2A-S3A and S2B-S3B, the warning system 100 selects and identifies one or more couples of two predicted trajectories $T_{Ai}$ and $T_{Bj}$ having at least one point in common (i.e., having either a crossing or a common lane region), among all the possible couples or combinations of two predicted trajectories $T_{Ai}$ and $T_{Bj}$ for the two target objects A, B respectively, in a step S4. More precisely, the warning system 100 identifies the couples of trajectories $T_{Ai}$ and $T_{Bj}$ having either a crossing point (that is, one point in common) or an overlapping lane region (that is, a part of a lane in common). For that purpose, the overlapping lane regions or crossing points between the predicted trajectories $T_{Ai}$ and the predicted trajectories $T_{Bj}$ of the two target objects A, B are determined for each possible combination of trajectories $T_{Ai}$ and $T_{Bj}$. Such a selection allows to exclude the couples of trajectories $T_{Ai}$ and $T_{Bj}$ that have no probability of collision between the two target objects A and B and therefore reduce the calculation efforts. Each couple of two trajectories $T_{Ai}$ and $T_{Bj}$ having at least one point in common (crossing point or overlapping lane region) is thus identified and selected for the following steps of the method. In other words, the following steps of the method are carried out using only the identified couples of trajectories $T_{Ai}$ and $T_{Bj}$.

The step of identification S4 is performed by an identification device 160 of the warning system 100.

Figure 9:
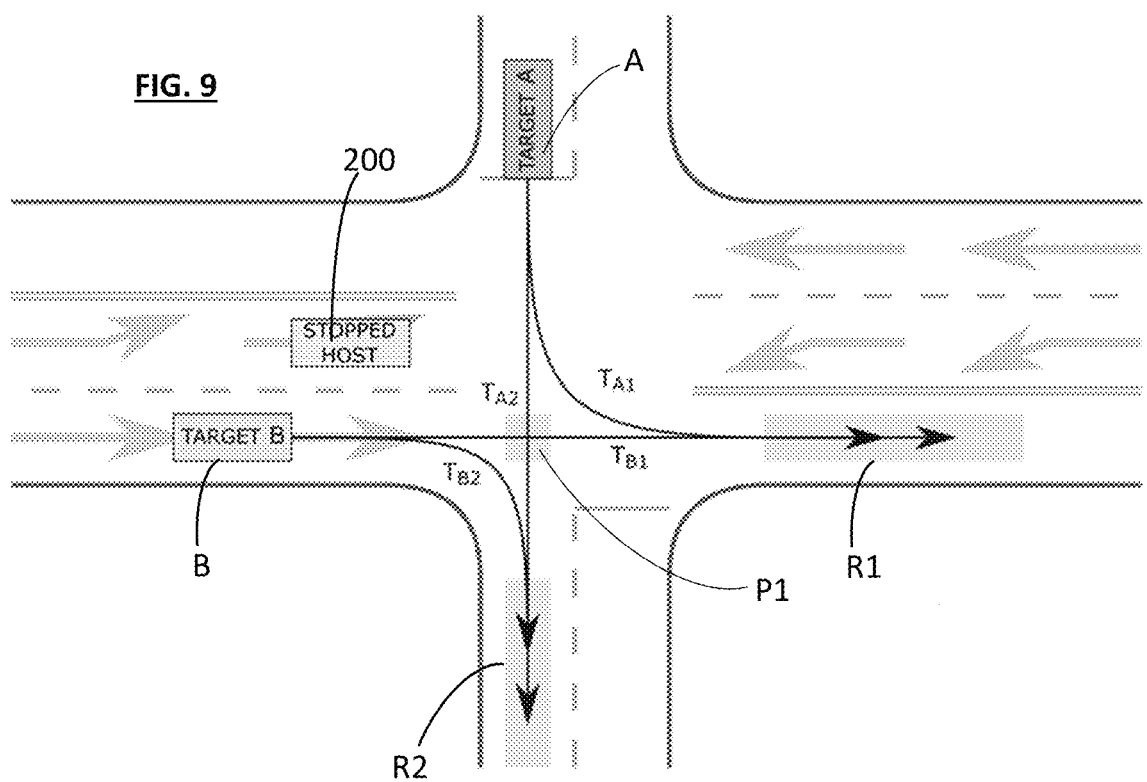
FIG. 9 is based on FIG. 8 and shows the overlapping regions and crossing points of all possible trajectories belonging to the two target objects.

FIG. 9 illustrates an exemplary situation: the target object A has two predicted trajectories $T_{A1}$ and $T_{A2}$ and the target object B has two predicted trajectories $T_{B1}$ and $T_{B2}$. Three couples of trajectories are identified:

($T_{A1}$, $T_{B1}$) having the overlapping region R1,
($T_{A2}$, $T_{B1}$) having the crossing point P1, and
($T_{B2}$, $T_{A2}$) having the overlapping region R2.

Then, in a step S7, the warning system 100 calculates successive discrete positions of the target objects A, B along each respective predicted trajectory $T_{Ai}$, $T_{Bj}$ at successive discrete times $t_k$ where $t_k=t_0+k*dt$, and where to is a current time and dt is a time increment (or time quantum). The time increment 'dt' can be predetermined and fixed. Advantageously, the time increment 'dt' is calculated based on the speed of the faster of the two target objects A, B. For example, 'dt' is a quantum of time during which the faster target object moves a certain quantum of distance 'ds' that is predetermined and chosen appropriately in order to avoid missing any potential collision. For example, ds is equal to 1 meter. In other words, dt can be calculated on the basis of the following equation:

$$ds = v_{faster\_target\_object} * dt, \text{ where } ds \text{ has a given value}$$
(for example 1 meter).

For example, let's assume that the speeds of target object A and B are: obj_A_speed=5 m/s and obj_B_speed=20 m/s. Then, in order to compare trajectories of both objects A, B, point by point, a quantum of the distance 'ds' is fixed to 1 m for example (which gives a guaranty that any potential collision will not be missed). Therefore, the time increment 'dt' determined as equal to $ds/v_{faster\_target\_object}$, which gives here dt=0.05 sec. As a consequence, the successive positions of the target object A will be 0 m, 0.25 m, 0.5 m, 0.75 m ... and the successive positions of the target object B will 0 m, 1 m, 2 m, .... Using a time increment depending on the speed of the faster target object allows to choose an appropriate time increment and avoids either too many calculations, if the time increment is chosen too small, or too wide gaps between successive positions that may cause to miss a potential collision, if the time increment is chosen too high.

Figure 11:
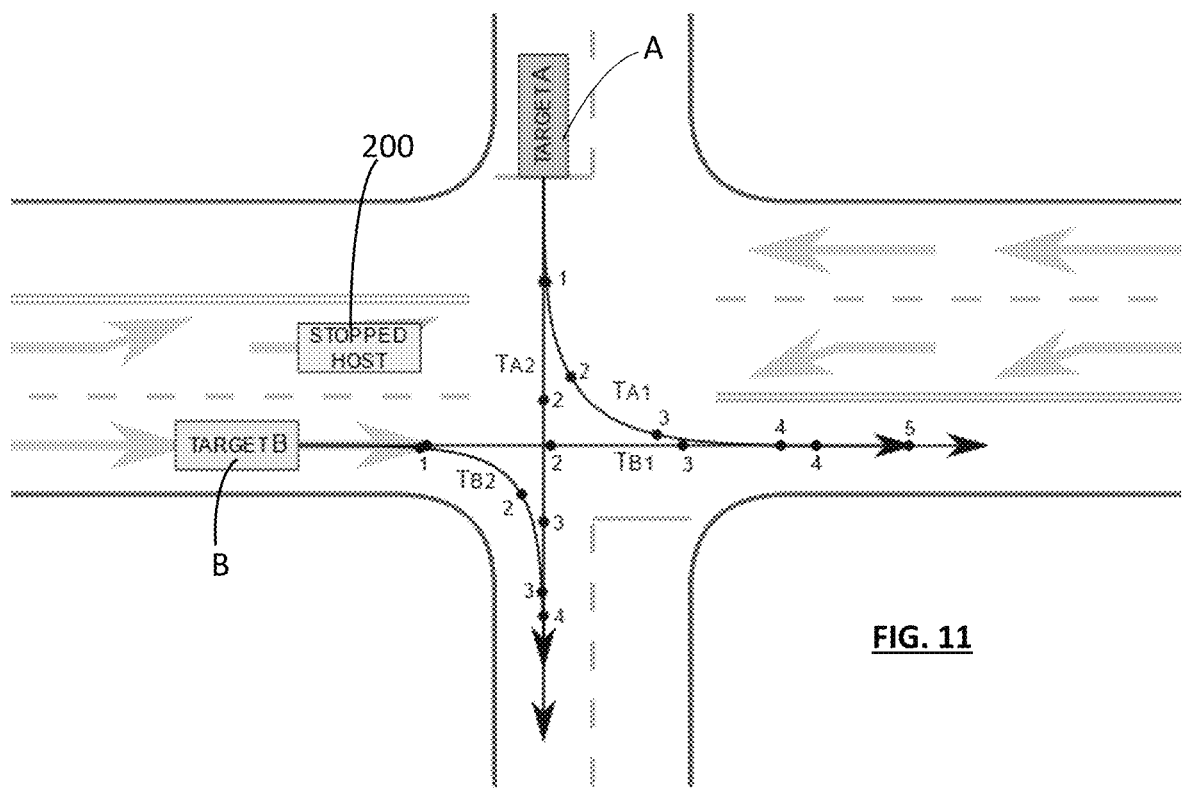
FIG. 11 is based on FIG. 8 and shows successive calculated positions of each target object along their possible trajectories.
Figure 12:
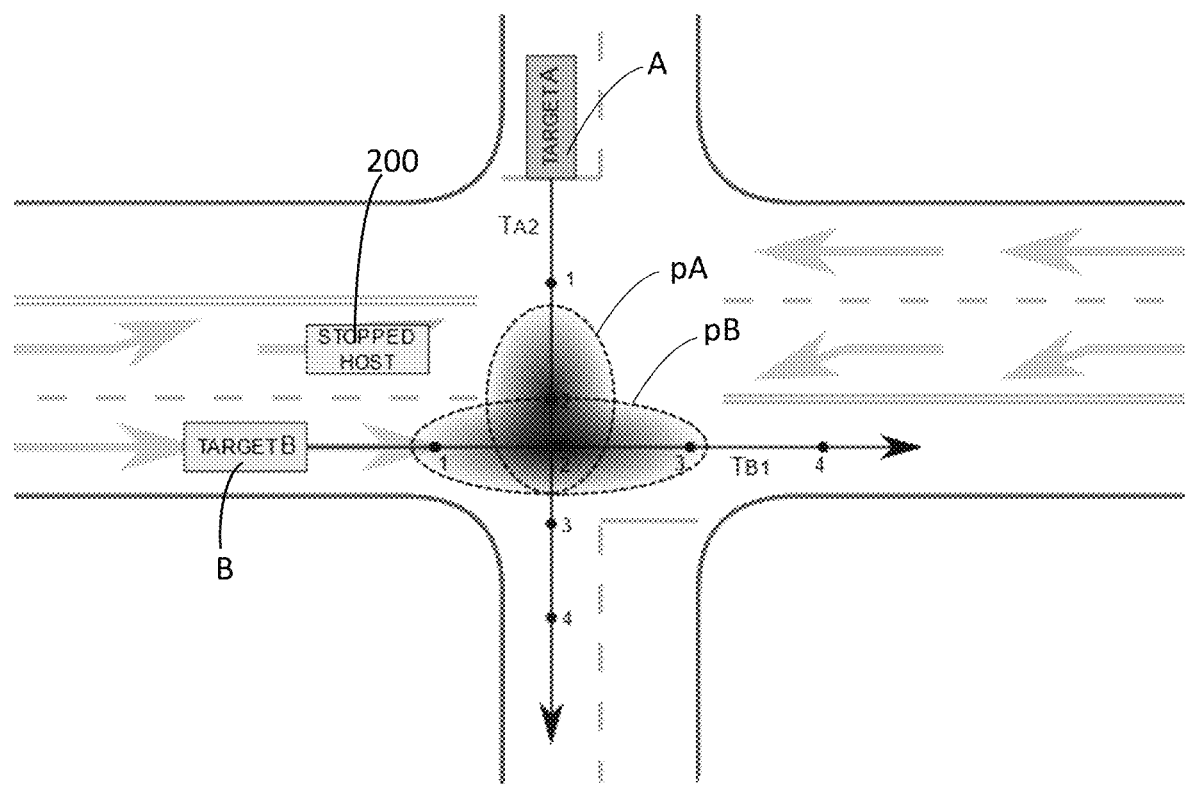
FIG. 12, based on FIG. 11, shows one identified pair of trajectories of the two target objects, corresponding to the earliest determined collision time instant, and schematically represents the probability distributions $f_{A,k}$ and $f_B$ of both target object positions at the earliest determined collision time.

The positions of each target object are calculated based on the current speed of said target object and optionally on the acceleration of said target object. FIG. 11 shows the calculated positions 1, 2, ... of each target object A, B along each respective predicted trajectory $T_{A1}$, $T_{A2}$, $T_{B1}$, $T_{B2}$, at successive time instances $t_1$, $t_2$, ... determined from the initial instant $t_0$ when target objects are positioned as represented in FIG. 11.

In a following step S8, for each identified couple of predicted trajectories $T_{Ai}$, $T_{Bj}$ (for each of $(T_{A1}, T_{B1})$, $(T_{A2}, T_{B1})$ and $(T_{B2}, T_{A2})$ in the example of FIG. 9), a time to collision tc_ij, when the target objects A, B may collide, is predicted. The predicted time to collision tc_ij corresponds to the earliest collision time when the two target objects moving along the respective predicted trajectories $T_{Ai}$, $T_{Bj}$ can collide with respect to the current time. More precisely, in the present embodiment, the predicted time to collision tc_ij corresponds to the earliest collision time when the distance d between target positions A, B is less than a predetermined safe distance threshold d_th. The predicted collision time tc_ij is advantageously one of the discrete time instants $t_k$ determined in step S7.

In a next step S9, probability distribution functions $f_{A,k}$ and $f_B$ of the target objects, for the respective positions of both target objects A, B at the time to collision tc_ij predicted for each identified couple of predicted trajectories $(T_{Ai}, T_{Bj})$, are derived, calculated. '$f_{A,k}$' is a probability density function of a k-th point (e.g. a corner) of target object A following the trajectory $T_{Ai}$. '$f_B$' is a probability density function of the centre of target object B following the trajectory $T_{Bj}$. The probability distribution functions depend on uncertainties of input data provided by sensors, navigation system, etc. and will not be described in more details in the present disclosure as this kind of probability distribution functions are well known by the person skilled in the part.

Figure 13:
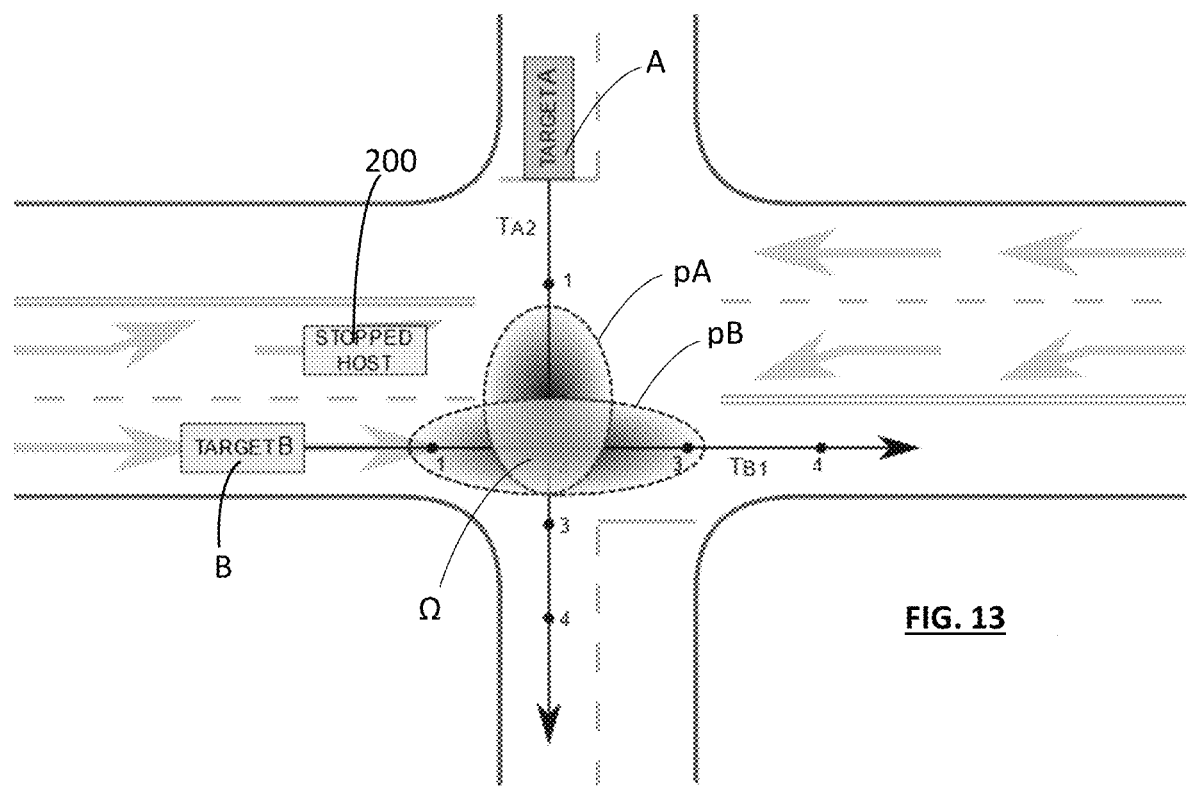
FIG. 13, based on FIG. 12, schematically shows a probability of collision at the earliest determined collision time.

In a step S10, for each identified couple of predicted trajectories $(T_{Ai}, T_{Bj})$, a probability of collision $P_{C\_ij}$ at the predicted time instant of collision tc_ij (determined in step S8), is calculated using on the probability distribution functions $f_{A,k}$ and $f_B$ determined in step S9. More precisely, the probability of collision $P_{C\_ij}$ for each identified couple of predicted trajectories $(T_{Ai}, T_{Bj})$ is determined as a product of the respective position probabilities of the two target objects A, B and can take into account an intersection area Ω of the probability distribution functions $f_{A,k}$ and $f_B$ of the two target objects A, B, as represented in FIG. 13. The calculation of the probability of collision $P_{C\_ij}$ can also take into account:

probabilities of the respective trajectories of said pair of colliding predicted trajectories $(T_{Ai}, T_{Bj})$ (that is, the probability that the target object A will choose said trajectory $T_{Ai}$, and the probability that the target object B will choose said trajectory $T_{Bj}$) for weighting the respective position probability distributions of target objects A and B, and/or the shapes of the target objects A and B.

The determination of the probability of collision $P_{C\_ij}$ for each identified couple of predicted trajectories $(T_{Ai}, T_{Bj})$ in step S10 can comprise steps S100 to S102, that will be described in more details in reference to FIG. 5B.

Figure 14:
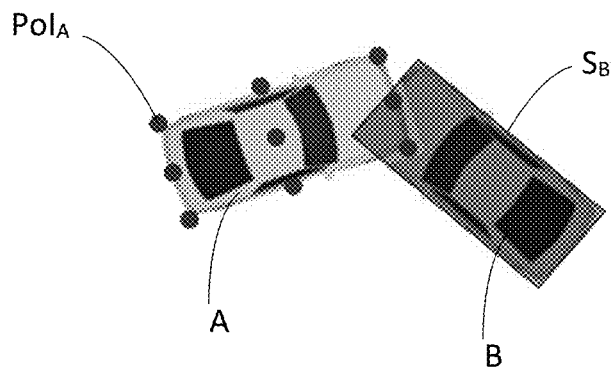
FIG. 14 shows two target objects in a situation of collision, one of the target objects being defined by N points and the other target object being defined by a rectangle shape.

In a particular embodiment, a number N of points of interest are determined for one of the two target objects A, B, for example for A, in a step S100. In addition, a predetermined geometrical bounding shape S is determined for the other target object, for example for B, in a step S101. The number N of points defining the target object A depends on its size. The N points can be disposed along a bounding shape or an outline of the target object in a 2D (or 3D) representation. For example, the number of points N may be 8 for a car, 10 or more for a truck, 12 or more for a bus, and 1 for a pedestrian. The geometrical bounding shape S of the other target object B may be configured to envelop an outline of the target object. It can be a rectangle shape for a car, a truck, a bus or a scooter, and a circle shape for a pedestrian. Let's assume that both target objects A and B of the exemplary embodiment of FIGS. 9, 11-14 are cars. The first target object A is defined by 8 points of interest $PoI_{An}$ with n=1, ..., 8 disposed along a rectangle bounding shape of the target A, as represented in FIG. 14: four points are disposed at the corners of the rectangle shape and four points are disposed at the centers of the sides of the rectangle shape. The second target object B is defined by a rectangle shape $S_B$ bounding an outline of the vehicle, as shown in FIG. 14.

For each of the N points of interest $PoI_{An}$ of the target object A, the probability that this point $PoI_{An}$ will be positioned in the area within the bounding shape $S_B$ of the target object B (here a rectangle shape) is calculated. This probability calculation gives N probabilities of collision $P_{Cn}$, corresponding to the N points of interest $PoI_{An}$ of the target object A, with 1≤n≤N, and the highest value of the N probabilities of collision $P_{Cn}$ is selected and determined as the probability of collision $P_{C\_ij}$ of the two target objects A and B for the identified couple of predicted trajectories $(T_{Ai}, T_{Bj})$.

For example, the probability of collision $P_{C\_ij}$ is calculated based on the following equations, in a step S102:

$$P_{c\_ij} = P_{t_A} P_{t_B} \max_{k=1..9} \left( \int \int \int f_{A,k}(x, y, \varphi) P_{B,k}(x, y) dx dy d\varphi \right)$$

$$P_{B,k}(x, y) = \int_{s=-\frac{L}{2}}^{\frac{L}{2}} \int_{r=-\frac{W}{2}}^{\frac{W}{2}} \int_{\psi=-\pi}^{\pi} f_B(x(s, r, \psi), y(s, r, \psi)) ds dr d\psi$$

where:
$f_{A,k}$ is the probability density function of the k-th point of target object A;
$f_B$ is the probability density function of the centre of target object B;
$P_{B,k}$ is the probability that target object B will overlap selected k-th point of target object A;
$P_c$ should be calculated just in intersection area of $f_A$, $f_B$ to limit computation effort
$P_{t_A}$, $P_{t_B}$: probabilities that target objects A, B will choose the particular considered trajectories (of the identified couple of predicted trajectories (TAi, TBj)); and s, r are positions along longitudinal and lateral axes of the target object B bounding box with center located at selected k-th point of the target object A.

The probability of collision $P_{C\_ij}$ is advantageously calculated integrating $f_{A,k}$ and $f_B$ just over the limited area just as represented in FIG. 13, to limit computational efforts. The integration area should be limited to a region in which the values of both integrated probability density functions have values which should not be neglected. Assuming jointly normal probability distributions $f_{A,k}$ and $f_B$, the integration area can be limited to +/−3σ (3 sigma) intervals centered around expected values of $f_{A,k}$ and $f_B$.

The steps S7 to S10 are performed by a calculation device 170 of the warning system 100, for calculating the probabilities of collision $P_{C\_ij}$ associated with the identified couples of predicted trajectories $T_{Ai}$, $T_{Bj}$.

Then, an alert control device 180 of the warning system 100 check one or more conditions to trigger an alert towards at least one of the two target objects A, B, as explained below.

In a step S11, the probability of collision $P_{C\_ij}$ for each identified couple of predicted trajectories ($T_{Ai}$, $T_{Bj}$) is compared to a predetermined threshold of probability of collision $P_{C\_th}$, by the alert control device 180. For example, the threshold of probability of collision $P_{C\_th}$ is set to 0.5 (or 50%). However, it could be set to a value less or more than 0.5 depending on the degree to which the manufacturer or a user desires that the warning system should be likely to react.

If the calculated probability of collision $P_{C\_ij}$ is more than the predetermined threshold (that is, if $P_{c\_ij} > P_{c\_th}$), one or more additional conditions can be checked before triggering an alert and warning at least one of the two targets A, B of the hazard.

A first condition relates to a time to collision TTC_ij, that is, a time period between the current time, referenced as '$t_0$' and the predicted time to collision tc_ij, is checked. More precisely, the time to collision TTC_ij is calculated and compared to first time threshold, a time to collision threshold TTC_th, in a step S12.

If the determined time to collision TTC_ij is less than the time to collision threshold TTC_th (TTC_ij<TTC_th), a second condition related to a time to collision since both target objects have mutual visibility 'TTCOV_ij' (Time To Collision since Objects mutual Visibility), is checked by the alert control device 180. 'TTCOV_ij' is defined as a time period between a time, referenced as 't_visibility', when target objects A and B can start seeing each other (just after passing the obstacle) and the predicted time to collision tc_ij for the identified couple of predicted trajectories ($T_{Ai}$, $T_{Bj}$), as illustrated in FIG. 6. The time to collision since both target objects have mutual visibility 'TTCOV_ij' is calculated and compared to a second time threshold, TTCOV threshold 'TTCOV_th', in a step S13.

If TTCOV_ij is less than the TTCOV threshold (TTCOV_ij<TTCOV_th), a third condition related to the position of the host vehicle 200 is checked by the alert control device 180 in order to evaluate whether or not triggering an alert towards at least one of the target objects A, B would be appropriate, in a step S14. An alert is considered as appropriate depending on the circumstances, when it is judged that it will help at least one of the two target objects to change its trajectory in due time in order to avoid the predicted collision and will not distract the target objects A, B.

For example, if the host vehicle 200 is equipped with a warning equipment like a laser projection device, the position of the host vehicle is considered as appropriate in case that the maximal distance range for projecting laser of this warning equipment is sufficient in order to alert at least one of the two targets A, B.

If the host vehicle 200 and at least one of the two target objects A, B is equipped with a V2V (Vehicle-to-Vehicle) communication system or a V2P (Vehicle-to-Pedestrian) communication system, the position of the host vehicle 200 does not matter, since it is guaranteed that at least one of two target objects will be able to receive the alert via a V2V or V2P communication.

Figure 16:
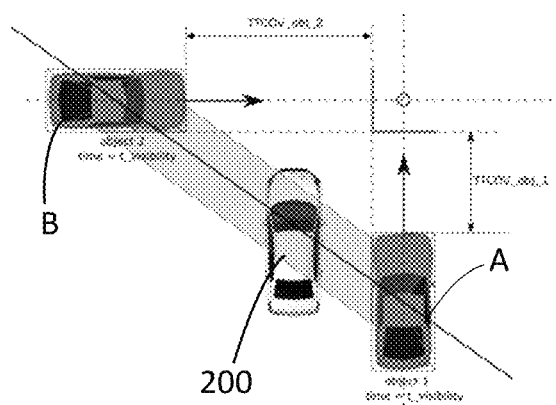
FIG. 16 represents schematically a host vehicle positioned between two target objects.

In other cases, in some embodiments, the host vehicle 200 has to be between the two objects A, B which are predicted to collide, in order to trigger an alert in a step S15. For example, the centre of the host vehicle 200 should be positioned in a connecting area defined by a rectangle extending along a line connecting the respective centres of the two target objects A, B, as represented by FIG. 16. The length of the connecting area should be such that connects the two target objects A, B, and its width is a parameter to be determined experimentally. When the host vehicle 200 is positioned in between the two target objects A, B, it is able to help the target objects A, B (that is, the driver(s) or pedestrian(s)) to see each other when glance at the host vehicle 200. Alerting by the host vehicle 200 located at a different position (different from a position in between the two target objects A, B) might distract the attention of the two target objects A, B (driver(s) or pedestrian(s)).

When all the conditions checked in steps S11 to S14 are satisfied, the alert control device 180 of the warning system 100 triggers an alert in a step S15. For example, the alert control device 180 transmits a command for warning at least one of the two target objects to a warning device equipping the host vehicle, such as a laser projection device, a light emitting device, a display device, V2V communication device or a V2P communication device. Upon reception of the command from the warning system 100, the warning device proceeds with producing an alert towards at least one for the two target objects A, B. The alert can be light emitted and/or projected on the road, a message displayed on a display of the vehicle that can be seen by at least one of the target objects A, B, a message sent to at least one of the target objects A, B via a V2V or a V2P communication, etc. . . . . .

In some embodiments, when one of the conditions checked in steps S11, S12, S13 and S14 is not satisfied, no alert is made by the host vehicle 200 at step S16. Indeed, in such circumstances, alerting the target objects A, B is considered as inappropriate because it might be useless, or too late or likely to distract the target objects A, B.

In other embodiments, only some of the conditions of steps S11, S12, S13 and S14 have to be satisfied in order to trigger an alert towards at least one of the target objects A, B.

Second Embodiment

In the second embodiment (or second situation), the target object A is a moving object following lanes and the target object B is not a moving object following lanes.

In this embodiment, in step S2A, the driving pattern determination device of the warning system 100 determines that the target object A is a moving object following lanes and, in step S2B, that the target object B is not a moving object following lanes.

After step S2A, the warning system 100 predicts one or more trajectories $T_{Ai}$, with i≥1, in the step S3A as previously described. The prediction is performed by the first prediction device 140.

Figure 10:
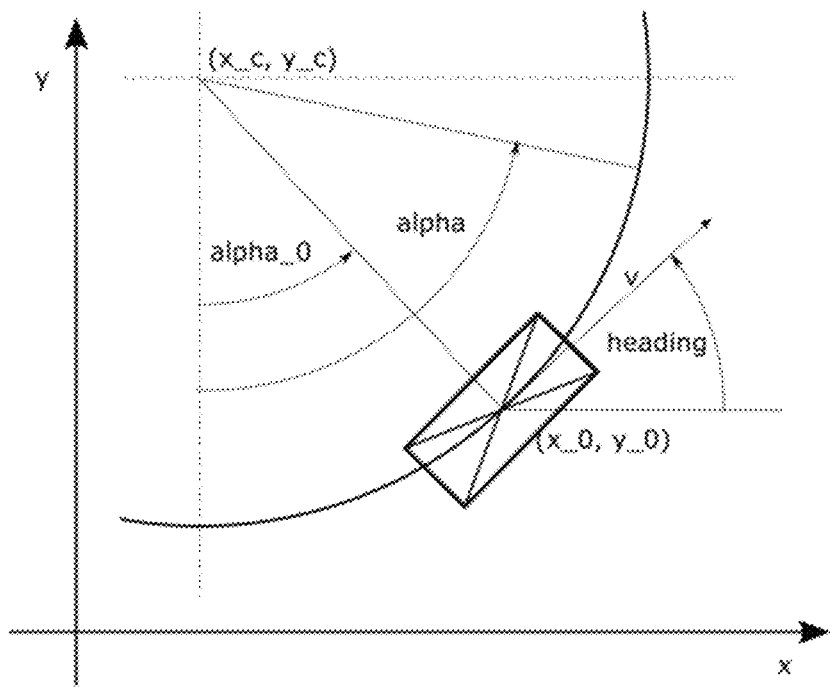
FIG. 10 shows a target object (e.g. a vehicle), that does not follow a lane, in a coordinate system of the host.

After step S2B, the warning system 100 predicts a trajectory $T_B$ for the target object B, that is calculated based on a current state of the target object B and a motion model which describes the behavior of the target object B, in a step S3C. This prediction is performed by a second prediction device 150. For example, the predicted trajectory $T_B$ for the target object B is determined using a parametric function. The target object B is assumed to comply with a certain motion model which describes its kinematic behavior. In a particular embodiment, the target object B is assumed to comply with CTRCV (Constant Turn Rate and Constant Velocity) motion model. With reference to FIG. 10, the following parameters and the following motion equations allow to model the motion of the target object B on a circle with a constant radius:

v object sped along the path
ω object yaw rate
x(t), y(t) extrapolated in time position of the object center
$x_0$, $y_0$ initial position of the object center in the host coordinate system
$x_c$, $y_c$ position of the center of the circle resembling object trajectory
θ initial object heading
R radius of curvature
$α_0$ initial angle used to start trajectory in the proper point $$R = \frac{v}{\omega}, \alpha_0 = \theta$$

$$x_c = x_\theta - R\sin(\alpha_\theta)$$

$$y_c = y_0 + R\cos(\alpha_0)$$

$$x(t) = x_c + R\sin(\alpha(t))$$

$$y(t) = y_c - R\cos(\alpha(t))$$

$$\alpha(t) = \alpha_0 + \frac{v}{R}t$$

In a particular embodiment, the sine and cosine terms in the above motion equations can be approximated by Taylor's series, limited to first four elements, in the neighborhood of nonzero initial target angle $α_0$. Alternatively, a six elements series approximation can be used. In that case, Ferrari formulas can be used to solve the system of equations.

In a following step S5, for each couple of trajectories $T_{Ai}$ and $T_B$, with i≥1, the warning system 100 determines whether or not the two trajectories $T_{Ai}$ and $T_B$ have at least one point in common or a distance between the two trajectories $T_{Ai}$ and $T_B$ that is less than the predetermined safe distance threshold $d_{th}$, and identifies one or more couples of two trajectories $T_{Ai}$ and $T_B$ that have either a point in common (that is, a crossing point) or a distance between $T_{Ai}$ and $T_B$ that is less than $d_{th}$. This step S5 is performed by the identification device 160.

To compare the two trajectories $T_{Ai}$ and $T_B$, $T_B$ can be transformed from an analytical equation into a quantized set of points, equally distributed over the time. The determination of the set of points distribution over the time can be done with respect to the velocity of the faster object, similar like in the first embodiment. Then, for each point of the trajectory $T_{Ai}$, it is possible to match point from the trajectory $T_B$ and calculate the distance between the two corresponding points of $T_{Ai}$ and $T_B$.

In order to determine whether or not a collision can be expected and is to be predicted for the considered pair of trajectories $T_{Ai}$ and $T_B$, a safe distance threshold equal to $3k\sigma_d$ is used, where k>1 is a factor used to suppress error introduced by using the Taylor's series approximation.

After the step S5 of identifying the one or more couples of predicted trajectories $T_{Ai}$ and $T_B$ having at least one point in common or a minimal distance between the two trajectories that is less than the safe distance threshold $d_{th}$ or a distance $d(t_{max})$ at a maximal instant $t_{max}$ that is less than the safe distance threshold $d_{th}$, the method goes to steps S7 to S15 or S16 that are performed for each identified couple of trajectories $T_{Ai}$ and $T_B$ (instead of being performed for each identified couple of trajectories $T_{Ai}$ and $T_{Bj}$ in case the two target objects are both moving objects following lanes). In particular, the steps S7 to S13 are adapted to be performed for the identified couples of trajectories $T_{Ai}$ and $T_B$ and, in FIG. 5A, the index "j" should be ignored in the steps S7 to S13.

Third Embodiment

In the third embodiment (or third situation), both the target object A and the target object B are not determined as moving objects following lanes.

In this embodiment, in step S2A, the driving pattern determination device of the warning system 100 determines that the target object A is not a moving object following lanes and, in step S2B, that the target object B is not a moving object following lanes.

After step S2A, in a step S3D, the warning system 100 predicts one trajectory $T_A$ for the target object A, that is calculated based on a current state of the target object A and a motion model which describes the behavior of the target object A. This step S3D is analogous to step S3C previously described but is performed for target object A instead of target object B. This prediction is performed by the second prediction device 150. The target object A is assumed to comply with a certain motion model which describes its dynamic behavior. In a particular embodiment, the target object A is assumed to comply with CTRCV (Constant Turn Rate and Constant Velocity) motion model.

After step S2B, the warning system 100 predicts one trajectory $T_B$ for the target object B, that is calculated based on a current state of the target object B and a motion model which describes the behavior of the target object B, in the step S3C as previously described. This prediction is also performed by the second prediction device 150. The target object B is assumed to comply with a certain motion model which describes its dynamic behavior. In a particular embodiment, the target object B is assumed to comply with CTRCV (Constant Turn Rate and Constant Velocity) motion model.

Figure 5A:
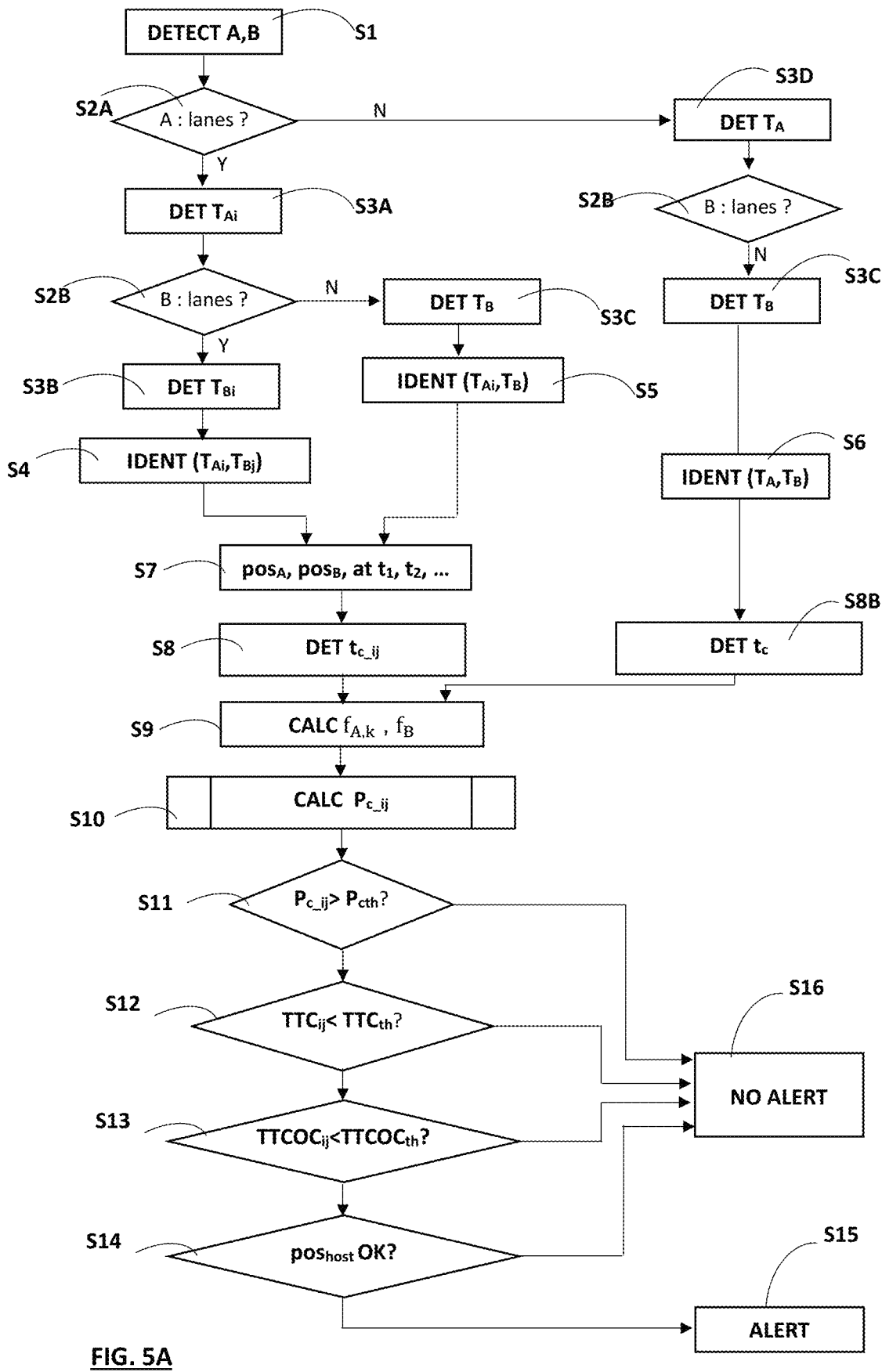
FIG. 5A represents a flow chart of a warning method, according to a particular embodiment.
Figure 5B:
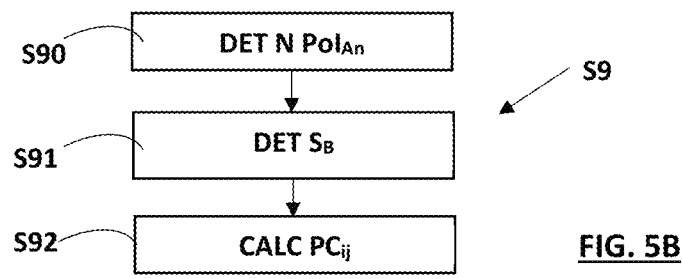
FIG. 5B represents a flow chart of a process for determining the probability of collision for a pair of colliding predicted trajectories of two target objects that are both moving objects following lanes.

For the sake of clarity, steps S2B and S3C are represented in double in FIG. 5A.

Then, in a step S6, for the couple of trajectories $T_A$ and $T_B$, the warning system 100 determines whether or not the two trajectories $T_A$ and $T_B$ have at least one point in common or a distance between the two trajectories $T_A$ and $T_B$ that is less than the predetermined safe distance threshold $d_{th}$, so as to possibly identify $T_A$ and $T_B$ as a couple of two trajectories that have either a point in common (that is, a crossing point) or a distance between $T_A$ and $T_B$ that is less than $d_{th}$. This step S6 is performed by the identification device 160, for example explained below.

For example, the identification device 160 can first determine if the two trajectories $T_A$ and $T_B$ have a crossing point and, if not, calculate the minimal distance between the two trajectories $T_A$ and $T_B$ and determine if this minimal distance is sufficient to cause a collision between the two target objects A, B, by comparing the minimal distance to the safe distance threshold $d_{th}$.

The identification device 160 first determines, for the pair of trajectories $T_A$ and $T_B$, whether or not the two predicted trajectories $T_A$ and $T_B$ have a crossing point, on the basis of the following two equations of collision:

$$t_c : \begin{cases} x_1(t) = x_2(t) \\ y_1(t) = y_2(t) \end{cases}$$

where [x1(t), y1(t)] and [x2(t), y2(t)] are the cartesian positions of target objects A and B respectively at time t and $t_c$ is the predicted instant of collision of A and B (at which the two equations are satisfied) for the two predicted trajectories $T_A$ and $T_B$. The cartesian coordinates x1(t), y1(t) are given by the predicted trajectory $T_A$ taking lanes. The cartesian coordinates x2(t), y2(t) are given by the motion equations complying with the CTRCV motion model for the target object B, as previously disclosed. The two equations of collision have a maximum power term $t^3$ that can be reduced to $t^2$ in order to be solved easily. Then, a feasible solution is selected (that is, within an acceptable range, for example a non-negative range).

If, no crossing point between the two predicted trajectories $T_A$ and $T_B$ is found, the identification device 160 calculates a minimal distance the trajectories $T_A$ and $T_B$.

For example, the Manhattan distance is used in order to facilitate the calculation. Alternatively, the Euclidian distance can be used. The Manhattan distance and the Euclidian distance, between the target objects A and B, are given by the following equations:

$$d_{manhattan}(t) = |x_1(t) - x_2(t)| + |y_1(t) - y_2(t)|$$

$$d_{cartesian}(t) = \sqrt{(x_1(t) - x_2(t))^2 + (y_1(t) - y_2(t))^2}$$

The identification device 160 calculates the time $t_m$ when the distance between the target object paths or trajectories is minimal, for each couple of trajectories $T_A$ and $T_B$. The time $t_m$ can be calculated on the basis of the following derivative equations:

$$t_m : \partial d_{manhattan}(t)/\partial t = 0$$

$$t_m : \partial d_{cartesian}(t)/\partial t = 0$$

It may happen, for the pair of trajectories $T_A$ and $T_B$, that no crossing point can be found and no time $t_m$ can be found by the warning system 100. In that case, the warning system 100 calculates the distance between the two trajectories $T_A$ and $T_B$ at a maximal instant $t_{max}$ and determines whether or not this distance $d(t_{max})$ is less than the safe distance threshold $d_{th}$.

The time $t_m$ corresponding to the time of minimum distance between the two trajectories $T_A$ and $T_B$ can be expressed as a function 's' of a plurality of parameters, as follows:

$$t_m = s(t, R_1, v_1, \omega_1, \theta_1, R_2, v_2, \omega_2, \theta_2)$$

Using the error propagation law, an uncertainty of time $t_m$ of the minimal distance 'd' and an uncertainty of that minimal distance d can be calculated as follows by the warning system:

$$\sigma_{t_m} = \sqrt{\left(\frac{\partial s}{\partial R_1}\right)^2 \sigma_R^2 + \left(\frac{\partial s}{\partial v_1}\right)^2 \sigma_v^2 + \left(\frac{\partial s}{\partial \omega_1}\right)^2 \sigma_\omega^2 + \cdots}$$

$$\sigma_d = \sqrt{\left(\frac{\partial d(t)}{\partial R_1}\bigg|_{t=t_m}\right)^2 \sigma_R^2 + \left(\frac{\partial d(t)}{\partial v_1}\bigg|_{t=t_m}\right)^2 \sigma_v^2 + \left(\frac{\partial d(t)}{\partial \omega_1}\bigg|_{t=t_m}\right)^2 \sigma_{\omega_1}^2 + \cdots}$$

where the points " . . . " in the above two equations indicate that for each of the parameters between parentheses in $t_m = s(t, R_1, v_1, \omega_1, \theta_1, R_2, v_2, \omega_2, \theta_2)$, a component having the same form as the first components indicated in the equation should be added.

In case that $T_A$ and $T_B$ are identified as a couple of trajectories that have either a point in common (that is, a crossing point) or a distance between them that is less than $d_{th}$, the warning system 100 proceeds with executing a step S8B and then with the steps S9 to S15 or S16 as previously described. The step S8B is analogous to step S8, but only for the couple of trajectories $T_A$ and $T_B$: for $T_A$ and $T_B$, a time to collision tc, when the target objects A, B may collide, is predicted. The predicted time to collision tc corresponds to the earliest collision time when the two target objects moving along the respective predicted trajectories $T_A$, $T_B$ can collide with respect to the current time.

When the two detected target objects are moving objects not following lanes, the possible crossing point or the closest distance between the predicted trajectories of the two target objects can be determined analytically using analytical predicted trajectories defined by equations. This means that instead of checking the distance between trajectories in quantified time steps (at successive discrete points), equations defining the trajectories $T_A$ and $T_B$ can be used. It is not necessary to perform step S7. This saves calculations compared to the target objects that are moving objects following lanes as, in such a case, it may be needed to check point by point the respective predicted positions of the two target objects. When one detected target object is a moving object following lanes and the other detected target object is not a moving object following lanes, the warning system 100 also checks point by point the respective predicted positions of the two target objects, using the analytic trajectory for the target object not following lanes. When the two detected target objects are moving objects following lanes, it may be difficult to have the analytical trajectories of the target objects. However, in case that analytical trajectories can be obtained, the possible crossing point or the closest distance between the predicted trajectories of the two target objects can be determined analytically.

It should be noted that, in case that in any of steps S4, S5 and S6, the warning system 100 does not identify any couple of trajectories having at least one point in common or in close vicinity, the warning process is aborted.

Figure 15:
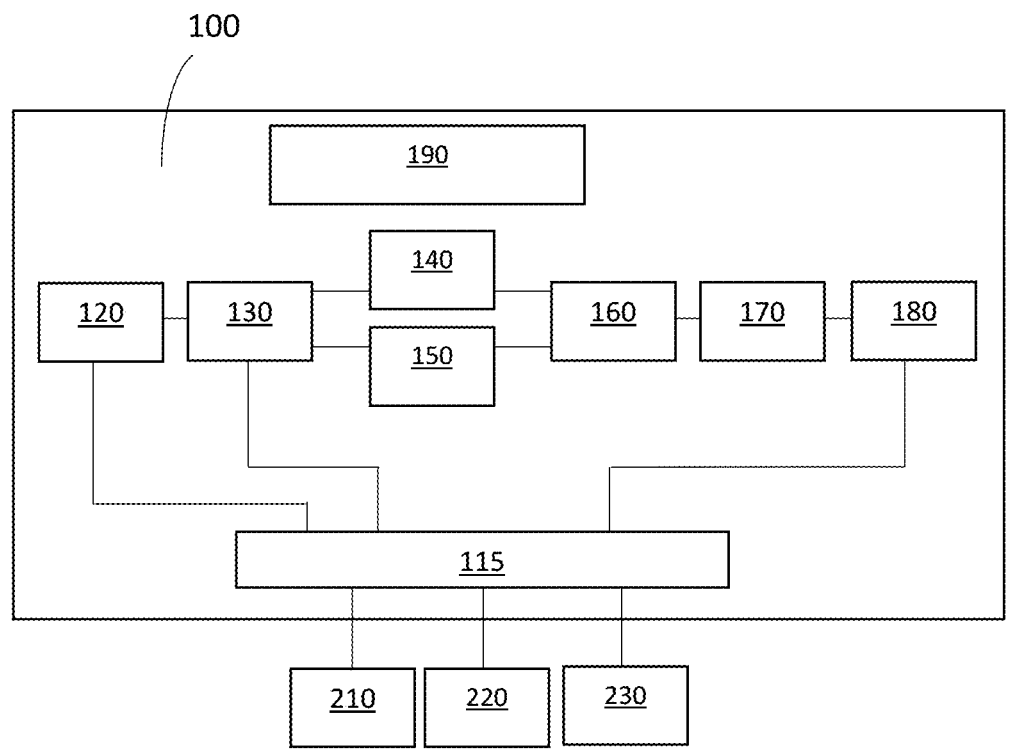
FIG. 15 represents schematically a warning system, according to an exemplary embodiment.

An exemplary embodiment of the warning system 100 is represented in FIG. 15. This warning system 100 can implement the first, second and third embodiments of the warning process of the present disclosure. It comprises the detection device 120, the driving pattern determination device 130, the first prediction device 140, the second prediction device 150, the identification device 160, the calculation device 170, the alert control device 180. A central processing device 190 controls the devices 120, 130, 140, 150, 160, 170 and 180. The warning system 100 also comprises a communication interface 115 with external data source devices 210, 220 and one or more external warning devices 230. For example, the data source devices are data sensors like cameras 210, and a GPS receiver 220, that are installed in the host vehicle 200.

They transmit the needed data (for example captured image data, lane information, GPS data, etc. . . . ) to the warning system 100 in order to perform the warning method described. At least a part of data source device may be part of the warning system 100. The warning devices 230 are installed in the host vehicle and can include a laser projection device, light emitting device, a display device, a V2P communication device for transmitting a warning message to at least one of the two target objects A, B via a V2V communication and/or a V2V communication device for transmitting a warning message to a pedestrian via a V2P communication.

What is claimed is:

1. A system comprising a warning system for a host vehicle, the warning system comprising:
    a detection device for detecting two target objects that cannot see each other;
    a road driving pattern determination device for determining, for each of the two target objects detected by the detection device, whether or not said target object is a moving object following road lanes by evaluating whether or not said target object is following the road lanes based on lane information;
    a first prediction device that predicts, based on the lane information, one or more trajectories ($T_{Ai}$, $T_{Bj}$) following the road lanes for a target object determined as a moving object following road lanes;
    a second prediction device that predicts, based on a current state of said target object and a motion model said target object is assumed to comply with, one trajectory ($T_B$) for a target object not determined as a moving object following road lanes, the second prediction device using a different type of trajectory prediction than the first prediction device;
    an identification device that, when two target objects are detected by the detection device, identifies at least one couple of two predicted trajectories having at least one point in common or a distance between said two predicted trajectories that is less than a predetermined safe distance threshold ($d_{th}$);
    a probability calculation device for calculating a probability of collision for each identified couple of predicted trajectories, that:
        determines a predicted collision time ($t_{c\_ij}$), when the two target objects are likely to collide by taking respectively the two predicted trajectories of said identified couple;
        calculates probability distribution functions ($f_{A,k}$, $f_B$) for positions of the two target objects at said predicted collision time ($t_{c\_ij}$); and
        calculates the probability of collision ($P_{C\_ij}$) for said identified couple of predicted trajectories using the calculated probability distribution functions for the positions of the two target objects at said predicted collision time ($t_{c\_ij}$); and
    an alert control device that checks whether or not the probability of collision calculated for said identified couple of predicted trajectories is more than a collision probability threshold ($P_{C\_th}$) in order to trigger an alert towards at least one of the two target objects.

2. The system according to claim 1, wherein, when at least one of said two target objects detected by the detection device is determined as a moving object following road lanes, the identification device is further configured to identify one or more couples of two predicted trajectories having at least one point in common or a distance between said two predicted trajectories that is less than a predetermined safe distance threshold, among all possible couples of two predicted trajectories for the two respective target objects.

3. The system according to claim 1, wherein, in calculating the probability of collision ($P_{C\_ij}$) for said identified couple of predicted trajectories, the probability calculation device is further configured to take into account an intersection area ($\Omega$) of the probability distribution functions ($f_{A,k}$, $f_B$) for the positions of the two target objects.

4. The system according to claim 1, wherein, in calculating the probability of collision ($P_{C\_ij}$) for said identified couple of predicted trajectories, the probability calculation device is further configured to take into account probabilities of said predicted trajectories.

5. The system according to claim 1, wherein, in calculating the probability of collision for said identified couple of predicted trajectories, the probability calculation device is further configured to take into account shapes of said target objects.

6. The system according to claim 5, wherein the probability calculation device is further configured to:
    determine a number N of points of interest ($PoI_{An}$) for a first of the two target objects, disposed along a bounding shape of said first target object, and a predetermined geometrical bounding shape ($S_B$) for a second of the two target objects;
    calculate, for each of the N points of interest ($PoI_{An}$) of the first target object, a probability of collision ($P_{C\_n}$) that said point of interest ($PoI_{An}$) will be positioned in area within the bounding shape ($S_B$) of the second target object; and
    select the highest value of the N calculated probabilities of collision as the probability of collision ($P_{C\_ij}$) of the two target objects for said identified couple of predicted trajectories.

7. The system according to claim 1, wherein, in predicting the one or more trajectories following the road lanes for a target object determined as a moving object following road lanes, the first prediction device is further configured to select trajectories that comply with road traffic rules.

8. The system of claim 1, wherein, when the two target objects detected by the detection device are moving objects following road lanes, the identification device is further configured to identify, among all possible couples of predicted trajectories of the two target objects respectively, the one or more couples of predicted trajectories that have a crossing point or an overlapping lane region.

9. The system of claim 1, wherein, when the two target objects detected by the detection device are one moving object following road lanes and one object not determined as a moving object following road lanes, the identification device is further configured to identify, among all possible couples of predicted trajectories of the two target objects respectively, the one or more couples of predicted trajectories that have a crossing point or distance between the two predicted trajectories that is less than said safe distance threshold.

10. The system of claim 1, wherein the probability calculation device is further configured to determine the earliest collision time, when the distance between the respective positions of the two target objects is less than a predetermined safe distance threshold (d_th), as the predicted collision time.

11. The system of claim 1, wherein the probability calculation device is further configured to calculate successive discrete positions of the two target objects along their respective predicted trajectories at successive discrete times ($t_k$) calculated using a time increment that depends on a speed of a faster of the two target objects, and the predicted collision time (tc_ij) corresponds to one of the successive discrete times.

12. The system of claim 1, wherein the alert control device is further configured to check that a time to collision (TTC_ij), the time to collision being a time period between a current time and a predicted time to collision (tc_ij), is less than a first time threshold (TTC_th) in order to trigger an alert towards at least one of the two target objects.

13. The system of claim 1, wherein the alert control device is further configured to check that a time to collision, when both target objects have mutual visibility ('TT-COV_ij'), is less than a second time threshold in order to trigger an alert towards at least one of the two target objects.

14. The system of claim 1, further comprising:
a host vehicle equipped with the warning system.

15. A method comprising:
detecting, by a detection device of a warning system, two target objects that cannot see each other;
determining, by a road driving pattern determination device of the warning system, for each of the two target objects detected, whether or not said target object is a moving object following road lanes by evaluating whether or not said target object is following the road lanes based on lane information;
predicting, by a first prediction device of the warning system and based on the lane information, one or more trajectories following the road lanes for a target object determined as a moving object following road lanes;
predicting, by a second prediction device of the warning system and based on a current state of said target object and a motion model said target object is assumed to comply with, one trajectory for a target object not determined as a moving object following road lanes, the second prediction device using a different type of trajectory prediction than the first prediction device;
when two target objects are detected by the detection device, identifying, by an identification device, at least one couple of two predicted trajectories that have at least one point in common or a distance between said two predicted trajectories that is less than a predetermined distance threshold ($d_{th}$); and
calculating, by a probability calculation device of the warning system, a probability of collision (PC_ij) for each identified couple of predicted trajectories, said calculating comprising:
determining a predicted collision time, when the two target objects are likely to collide by taking respectively the two predicted trajectories of said identified couple;
calculating probability distribution functions for positions of the two target objects at said predicted collision time;
calculating the probability of collision for said identified couple of predicted trajectories using the calculated probability distribution functions for the positions of the two target objects at said predicted collision time; and
checking, by an alert control device, whether or not the probability of collision calculated for at least one of the one or more identified couples of predicted trajectories, is more than a collision probability threshold, in order to trigger an alert towards at least one of the two target objects.

16. The method according to claim 15, wherein, when at least one of said two target objects detected by the detection device is determined as a moving object following road lanes, the method further comprises:
identifying, by the identification device, one or more couples of two predicted trajectories having at least one point in common or a distance between said two predicted trajectories that is less than a predetermined safe distance threshold, among all possible couples of two predicted trajectories for the two respective target objects.

17. The method according to claim 15, wherein the method further comprises at least one of:
calculating, by the probability calculation device, the probability of collision ($P_{C\_ij}$) for said identified couple of predicted trajectories by taking into account an intersection area ($\Omega$) of the probability distribution functions ($f_{A,k}$, $f_B$) for the positions of the two target objects;
calculating, by the probability calculation device, the probability of collision ($P_{C\_ij}$) for said identified couple of predicted trajectories by taking into account probabilities of said predicted trajectories; or
calculating, by the probability calculation device, the probability of collision for said identified couple of predicted trajectories by taking into account shapes of said target objects.

18. The method according to claim 15, wherein the method further comprises:
determining, by the probability calculation device, a number N of points of interest ($PoI_{An}$) for a first of the two target objects, disposed along a bounding shape of said first target object, and a predetermined geometrical bounding shape ($S_B$) for a second of the two target objects;
calculating, by the probability calculation device and for each of the N points of interest ($PoI_{An}$) of the first target object, a probability of collision ($P_{C\_n}$) that said point of interest ($PoI_{An}$) will be positioned in an area within the bounding shape ($S_B$) of the second target object; and
selecting, by the probability calculation device, the highest value of the N calculated probabilities of collision as the probability of collision ($P_{C\_ij}$) of the two target objects for said identified couple of predicted trajectories.

19. The method according to claim 15, wherein the method further comprises: calculating, by the probability calculation device, successive discrete positions of the two target objects along their respective predicted trajectories at successive discrete times ($t_k$) calculated using a time increment that depends on a speed of a faster of the two target objects, and the predicted collision time (tc_ij) corresponds to one of the successive discrete times.

20. The method according to claim 15, wherein the method is performed by a host vehicle equipped with the warning system.

* * * * *